United States Patent
Dennis et al.

(10) Patent No.: US 9,169,155 B2
(45) Date of Patent: Oct. 27, 2015

(54) METHOD AND APPARATUS FOR MAKING VACUUM INSULATED GLASS (VIG) WINDOW UNIT INCLUDING CLEANING CAVITY THEREOF

(75) Inventors: Timothy A. Dennis, Bloomdale, OH (US); Andrew W. Pantke, Belleville, MI (US); Jeffrey A. Jones, Ann Arbor, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 86 days.

(21) Appl. No.: 13/463,262

(22) Filed: May 3, 2012

(65) Prior Publication Data
US 2013/0292000 A1 Nov. 7, 2013

(51) Int. Cl.
*C03C 23/00* (2006.01)
*E06B 3/66* (2006.01)
*E06B 3/677* (2006.01)
*E06B 3/663* (2006.01)

(52) U.S. Cl.
CPC ........... *C03C 23/0075* (2013.01); *E06B 3/6612* (2013.01); *E06B 3/6775* (2013.01); *E06B 3/66304* (2013.01); *Y02B 80/24* (2013.01)

(58) Field of Classification Search
CPC .............. C03C 23/0075; E06B 3/6612; E06B 3/66304; E06B 3/6775; Y02B 80/24
USPC ........... 141/7, 8, 66, 98, 197; 156/109, 272.2, 156/285, 286
See application file for complete search history.

(56) References Cited

U.S. PATENT DOCUMENTS

| | | | |
|---|---|---|---|
| 4,028,135 A * | 6/1977 | Vig et al. | 134/1 |
| 5,657,607 A | 8/1997 | Collins et al. | |
| 5,664,395 A | 9/1997 | Collins et al. | |
| 5,902,652 A | 5/1999 | Collins et al. | |
| 6,231,676 B1 * | 5/2001 | Rudd et al. | 134/1 |
| 6,242,368 B1 * | 6/2001 | Holmer et al. | 438/795 |
| 6,541,083 B1 | 4/2003 | Landa et al. | |

(Continued)

FOREIGN PATENT DOCUMENTS

| | | | | |
|---|---|---|---|---|
| JP | 2004042006 A | * | 2/2004 | ............... C02F 1/34 |
| JP | 2005-231930 | | 9/2005 | |
| JP | 2010153773 A | * | 7/2010 | |

OTHER PUBLICATIONS

Chen, Shu-Fang et al., "Resist Residue Removal Using UV Ozone Treatment," Advances in Resist Materials and Processing Technology XXVII, Allen Robert D. et al., Eds., Proc. of SPIE vol. 7639 (2010) Abstract, pp. 76391A-1 to 76391A-9.*

*Primary Examiner* — Timothy L Maust
(74) *Attorney, Agent, or Firm* — Nixon & Vanderhye P.C.

(57) ABSTRACT

A method and apparatus for cleaning a cavity of a vacuum insulated glass window assembly is provided in which a cleaning gas mixture of or including ozone is introduced into the cavity of the vacuum insulated glass assembly and allowed to react with residual materials, such as, for example, hydrocarbons and/or polymers. Reacted hydrocarbons and/or polymers are then removed from the vacuum cavity along with any residual cleaning gas mixture. The cleaning method is preferably performed at substantially ambient temperatures or at least temperatures below about 250° C. The ozone cleaning cycle may be repeated multiple times and followed by additional purges with other gases, such as for example nitrogen. Additional energy may be provided by heating, RF plasma; corona discharge, UV lamp, and/or the like.

23 Claims, 4 Drawing Sheets

(56) References Cited

U.S. PATENT DOCUMENTS

| | | |
|---|---|---|
| 6,555,835 B1 * | 4/2003 | Wydeven .................. 250/504 R |
| 6,692,600 B2 * | 2/2004 | Veerasamy et al. ........... 156/109 |
| 6,701,749 B2 | 3/2004 | Wang et al. |
| 7,025,831 B1 * | 4/2006 | Butterbaugh et al. ........ 118/724 |
| 8,137,494 B2 | 3/2012 | Cooper et al. |
| 8,202,587 B2 | 6/2012 | Wang |
| 8,282,768 B1 * | 10/2012 | Smargiassi et al. ...... 156/345.33 |
| 8,398,923 B2 * | 3/2013 | Mole ............................. 422/124 |
| 8,734,663 B2 * | 5/2014 | Smargiassi et al. ............ 216/66 |
| 2003/0051436 A1 | 3/2003 | Veerasamy et al. |
| 2009/0035586 A1 * | 2/2009 | Cangemi et al. ............. 428/446 |
| 2009/0151855 A1 | 6/2009 | Wang et al. |
| 2012/0213951 A1 | 8/2012 | Dennis |

* cited by examiner

METHOD AND APPARATUS FOR MAKING VACUUM INSULATED GLASS (VIG) WINDOW UNIT INCLUDING CLEANING CAVITY THEREOF

TECHNICAL FIELD

This disclosure relates generally to methods and apparatus for making a vacuum insulated glass (VIG) window unit, the method including cleaning a cavity formed between first and second glass substrates of the VIG unit. The disclosure more particularly relates to methods for cleaning a cavity of a VIG unit to remove residual impurities, such as, for example, residual hydrocarbon and/or polymer binders and/or solvents remaining as a result of the manufacturing process, from the cavity. The disclosure further relates to using at least ozone in a cleaning process gas to oxidize and/or reduce residual carbon based compounds to make them more suitable for (or easier to) removal during subsequent processes used to make the VIG unit by, for example, making these residual compounds more volatile.

BACKGROUND AND SUMMARY OF EXAMPLE EMBODIMENTS

Vacuum insulating glass (VIG) units typically include at least two spaced apart glass substrates that enclose an evacuated or low-pressure space/cavity therebetween. The substrates are interconnected by a peripheral edge seal and typically include spacers between the glass substrates to maintain spacing between the glass substrates and to avoid collapse of the glass substrates that may be caused due to the low pressure environment that exists between the substrates. Some example VIG configurations are disclosed, for example, in U.S. Pat. Nos. 5,664,395, 5,657,607 and 5,902,652, the disclosures of which are all hereby incorporated by reference herein in their entireties.

FIGS. 1 and 2 illustrate a typical VIG unit 1 and elements that form the VIG unit 1. For example, VIG unit 1 may include two spaced apart glass substrates 2, 3, which enclose an evacuated low-pressure space/cavity 6 therebetween. Glass sheets or substrates 2, 3 are interconnected by a peripheral edge seal 4 which may be made of fused solder glass, for example. An array of support pillars/spacers 5 may be included between the glass substrates 2, 3 to maintain the spacing of substrates 2, 3 of the VIG unit 1 in view of the low-pressure space/gap present between the substrates 2, 3.

A pump-out tube 8 may be hermetically sealed by, for example, solder glass 9 to an aperture/hole 10 that passes from an interior surface of one of the glass substrates 2 to the bottom of a recess 11 in the exterior surface of the glass substrate 2. A vacuum is attached to pump-out tube 8 to evacuate the interior cavity 6 to a low pressure, for example, using a sequential pump down operation. After evacuation of the cavity 6, the tube 8 is melted to seal the vacuum. Recess 11 retains the sealed pump-out tube 8. Optionally, a chemical getter 12 may be included within a recess 13 that is disposed in an interior face of one of the glass substrates, e.g., glass substrate 2. The chemical getter 12 may be used to absorb or hind with certain residual impurities that may remain after the cavity 6 is evacuated and sealed.

VIG units with fused solder glass peripheral edge seals 4 are typically manufactured by depositing glass frit, in a solution (e.g., frit paste), around the periphery of substrate 2. This glass frit paste ultimately forms the glass solder edge seal 4. A second substrate 3 is brought down on substrate 2 so as to sandwich spacers/pillars 5 and the glass frit solution between the two substrates 2, 3. The entire assembly including the glass substrates 2, 3, the spacers or pillars 5 and the seal material (e.g., glass fit in solution or paste), is then heated to a temperature of at least about 500° C., at which point the glass frit melts, wets the surfaces of the glass substrates 2, 3, and ultimately forms a hermetic peripheral or edge seal 4.

After formation of the edge seal 4, a vacuum is drawn via the pump-out tube 8 to form low pressure space/cavity 6 between the substrates 2, 3, The pressure in space 6 may be produced by way of an evacuation process to a level below atmospheric pressure, e.g., below about $10^{-2}$ Torr. To maintain the low pressure in the space/cavity 6, substrates 2, 3 are hermetically sealed. Small high strength spacers/pillars 5 are provided between the substrates to maintain separation of the approximately parallel substrates against atmospheric pressure. As noted above, once the space 6 between substrates 2, 3 is evacuated, the pump-out tube 8 may be sealed, for example, by melting using a laser or the like.

As a result of the process used to manufacture the VIG, including those used to form the seal 4 discussed above, residual hydrocarbons and/or polymers, such as, for example, solvents and binders used for making the frit paste that ultimately forms the seal between the transparent glass substrates of the VIG unit, may remain in the vacuum cavity. It is desirable to remove these residuals, as they have a potentially damaging effect on the VIG unit over time. For example, residual hydrocarbons and/or polymers may contaminate the vacuum cavity after the VIG is sealed (e.g., by producing volatile $CO_X$ gases that degrade vacuum levels), and thereby continuously degrade the insulating value (e.g., R-value) of the VIG unit. The residual hydrocarbons may also react with coatings, such as, for example, a low-E coating that may be present on an interior surface of one of the glass substrates that form the vacuum cavity, further damaging performance of the VIG unit.

As mentioned above, VIG units with fused solder glass edge seals 4 are typically manufactured by depositing glass frit, in a solution (e.g., frit paste), around the periphery of substrate 2. This glass frit ultimately forms the glass solder seal 4. A second substrate 3 is brought down on substrate 2 so as to sandwich spacers/pillars 5 and the glass frit solution between the two substrates 2, 3. The entire assembly including the glass substrates 2, 3, the spacers/pillars 5 and the seal material (e.g., glass frit in solution), is then heated to a temperature of at least about 500° C., at which point the glass frit melts, wets the surfaces of the glass substrates 2, 3, and ultimately forms a hermetic seal 4. An advantage of providing this high-temperature processing is that much of the residual hydrocarbon and/or polymer compounds, such as, for example, the binders and solvents used to make the frit paste for the solder glass seal 4, are oxidized or burned off during this process and are then removed from the vacuum cavity prior to sealing.

However, a new class of materials are being developed for use in forming hermetic edge seals for VIG units. For example, a vanadium inclusive seal composition is disclosed in U.S. patent application Ser. No. 13/354,963, entitled, "Coefficient of Thermal Expansion Filler for Vanadium-Based Frit Materials and/or Methods of Making and/or Using the Same," filed Jan. 20, 2012, the disclosure of which is incorporated by reference herein in its entirety. These new seal compositions may sometimes be referred to as VBZ (e.g., vanadium, barium, zinc) based compositions. These vanadium inclusive and/or VBZ type seal compositions provide certain advantages over other known seal compositions. However, when using VBZ type seal compositions, a lower temperature sealing thermal profile is used to maintain the desired temper of the glass of the VIG unit because VBZ compositions have a lower firing temperature (e.g., <250° C.) than certain other conventional glass frit compositions used to form seals in VIG units. One example reason for using lower firing temperatures to make VIG units using, for example, a VBZ seal, is that VBZ seal compositions may begin to soften at the higher temperatures (e.g., 300° C.-350° C.). As a result of this softening, gases being evolved during the burning of residual carbon compounds become entrapped in the VBZ material. This causes expansion of the softened VBZ material and results in a porous glass having insufficient strength and which cannot hold a vacuum. The lower thermal profile used to form a VBZ type seal is such that the normal high-temperature burn out procedure described above regarding fused solder glass seals 4 to oxidize and burn off residual hydrocarbons and polymers cannot be used. The lower seal curing temperature(s) used to cure/form the edge seal, when the seal is made of a vanadium inclusive and/or VBZ material, are insufficient to provide acceptable burn off of residual hydrocarbons and polymers.

Therefore, what is needed is a lower temperature method to rapidly decompose the residual hydrocarbons and/or polymers in the cavity of the VIG unit in at least situations that use lower temperature profile edge seal compositions, such as, for example, and without limitation, vanadium based and/or VBZ, type seal compositions. As discussed above, with the development of newer seal compositions, such as, for example, and without limitation, vanadium based and/or VBZ type seal compositions, a new lower temperature sealing thermal profile is generally used to maintain desired temper strength of the glass substrates of the VIG unit and/or to maintain the structural stability and vacuum maintaining properties of the resulting seal. As further noted above, the lower temperature cycle is not typically sufficient to sufficiently remove and/or burn off a sufficient amount of residual hydrocarbons and polymers, such as, for example, and without limitation, from the solvent and binder materials used for making the edge seal paste. The hydrocarbon and/or polymer residue in the interior of the VIG vacuum cavity may contaminate the vacuum once the VIG unit is sealed, and may further degrade various coatings that may be present on interior surfaces of the glass substrates used in the VIG units. For example, in certain instances residual carbon that coats the internal surface of the glass substrate(s) may remain, such as, for example, with a thin monolayer of hydrocarbons and binder polymer. This carbon residue may detach from the interior surface of the glass over time and decompose under ultraviolet radiation of sunlight and produce volatile, for example, $CO_X$ gases which degrade the vacuum levels and adversely decrease the insulating value (e.g., R-value) of the VIG unit. Additionally, the residual carbons may, over time, react with coatings on the interior glass surface, such as, for example, low-E coatings, further degrading performance of the VIG unit.

To solve these and/or other drawbacks, a new cleaning process to remove residual hydrocarbon compounds is disclosed and described herein with reference to certain example embodiments. For example, according to certain example embodiments, including ozone ($O_3$) as a component of a purge gas used during initial pump down has been found to oxidize carbon compounds and convert them to more volatile CO and/or $CO^2$ that may then be easily removed through sequential pump down operations and may be even further diluted by optional sequential $N_2$ purging and a final deep vacuum pull down. The removal of these residual carbon compounds enhances the overall performance of VIG units by, for example, and without limitation, enhancing the overall insulating value (e.g., R-value), imimproving the useful life of the VIG unit and/or reducing degradation of optional coatings that may be used on an interior surface of the glass substrates of the VIG unit.

According to certain example embodiments, an example method of decomposing residual carbon for removal from the vacuum cavity of a VIG window unit is provided, wherein at least an ozone ($O_3$) and oxygen ($O_2$) gas mixture is introduced into the VIG vacuum cavity during and/or before an initial stage of a vacuum pump down process. According to certain example embodiments, a small percentage of $O_3$, such as, for example, and without limitation, in a range of about from 5-10 wt. % ozone, is generated using, for example, an ozone generator using air and/or pure oxygen. The resulting $O_3/O_2$ mixture is then introduced into the vacuum cavity of the VIG under reduced pressure, allowed to react with the residual hydrocarbons and/or polymers, and then removed from the cavity by, for example, a vacuum pump. A cycle of $O_3/O_2$ purges may be repeated as necessary to reduce the contaminants to suitable or acceptable levels. Example acceptable contaminant levels may be, for example, and without limitation, from about 10E-12 or lower. It will he understood that acceptable contaminant levels may be determined or selected by the manufacturer.

It is also noted that the ozonization of the vacuum cavity of the VIG unit described above may performed at substantially ambient temperatures thereby avoiding the disadvantages and problems associated with high-temperature processing, especially for example when using newer seal compositions, such as, for example, vanadium inclusive and/or VBZ type seal compositions. It may sometimes be the case that additional energy may be used to facilitate and/or improve the carbon removal achieved by the ozonization process described above. Thus, it is contemplated that additional energy in the form of, for example, and without limitation, elevated temperatures (remaining below levels that might adversely affect the seal composition; e.g., remaining below about 250 degrees C.), radio frequency (RF) plasma, corona discharge (electric fields), UV lamp, and/or the like, may be used to increase reaction rates of the residual hydrocarbons and/or polymers and the ozone.

According to certain further example embodiments, the resulting trace amounts of volatile carbons that may remain, even after an ozonization process such as, for example, may be further diluted by sequential $N_2$ purging and/or a final deep vacuum pull down. Using an ozonization process along the lines described by way of example above, facilitates removal of residual carbon compounds, improves the overall lifetime of a VIG window unit, provides a more stable and predictable R-value and helps maintain coatings that may be present on the surface of the glass substrate in the vacuum cavity.

These and other advantages are provided by a method for cleaning a vacuum cavity of a VIG window unit comprising: providing a vacuum insulated glass window unit including a vacuum cavity; generating a cleaning gas mixture comprising ozone; pumping the cleaning gas mixture comprising ozone into the vacuum cavity of the vacuum insulated glass window unit; maintaining the cleaning gas mixture comprising ozone in the vacuum cavity of the vacuum insulate glass window unit for a dwell time; and removing compounds created by a reaction of the cleaning gas mixture, and residual cleaning gas from the vacuum cavity.

According to certain example embodiments, there is provided an apparatus comprising: an ozone generator; a bi-directional pump operatively coupled to said ozone generator and operatively coupled to a pump-out tube, said pump-out tube providing access to a cavity between first and second substrates; and a gas source providing a gas including oxygen to the ozone generator, wherein said bi-directional pump pumping the cleaning gas mixture comprising ozone generated by the ozone generator into the cavity, maintaining the cleaning gas mixture comprising ozone in the cavity for a predetermined dwell time, and removing compounds created by reaction of the cleaning gas mixture and residual cleaning gas from the cavity These and other embodiments and advantages are described herein with respect to certain example embodiments and with reference to the following drawings in which like reference numerals refer to like elements, and wherein:

Figure 2:
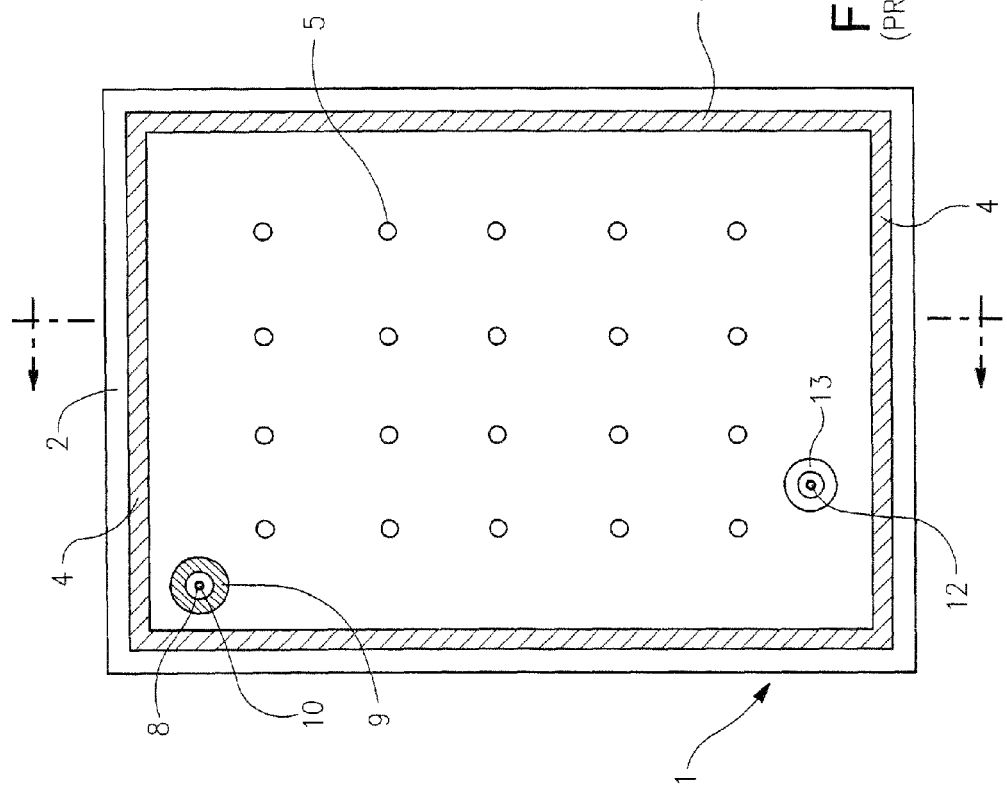
Figure 1:
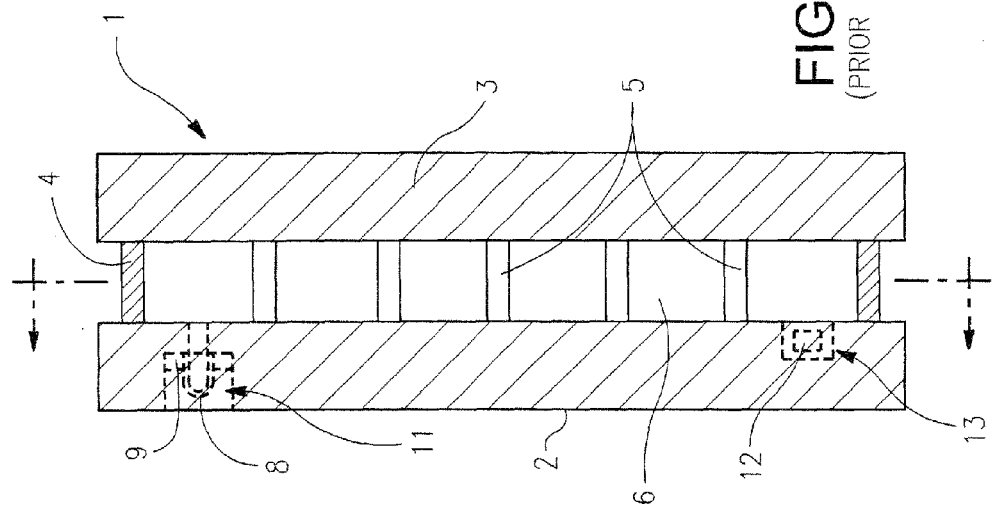
FIG. 1 is a cross sectional schematic diagram of a conventional VIG unit.
Figure 3:
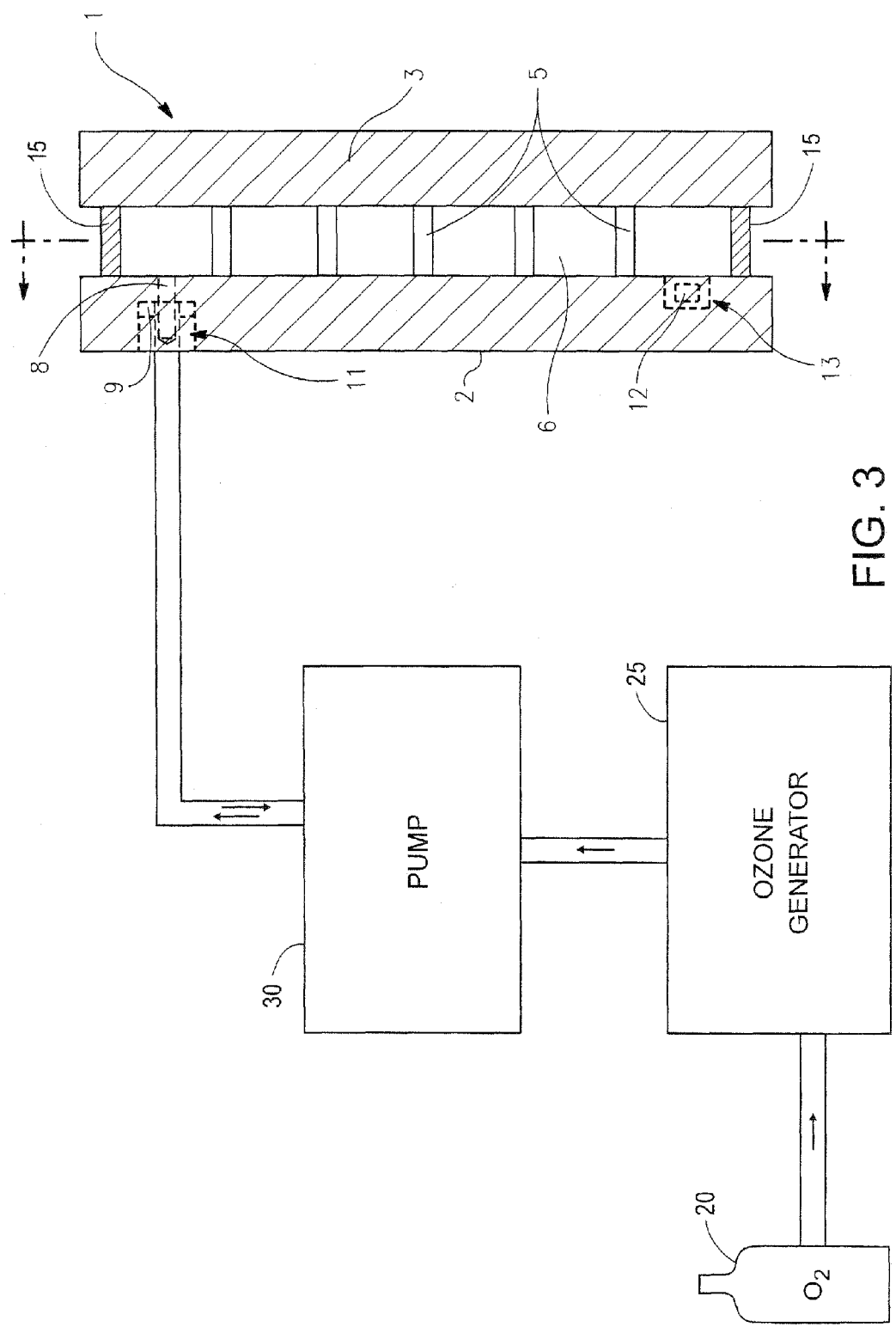
Figure 4:
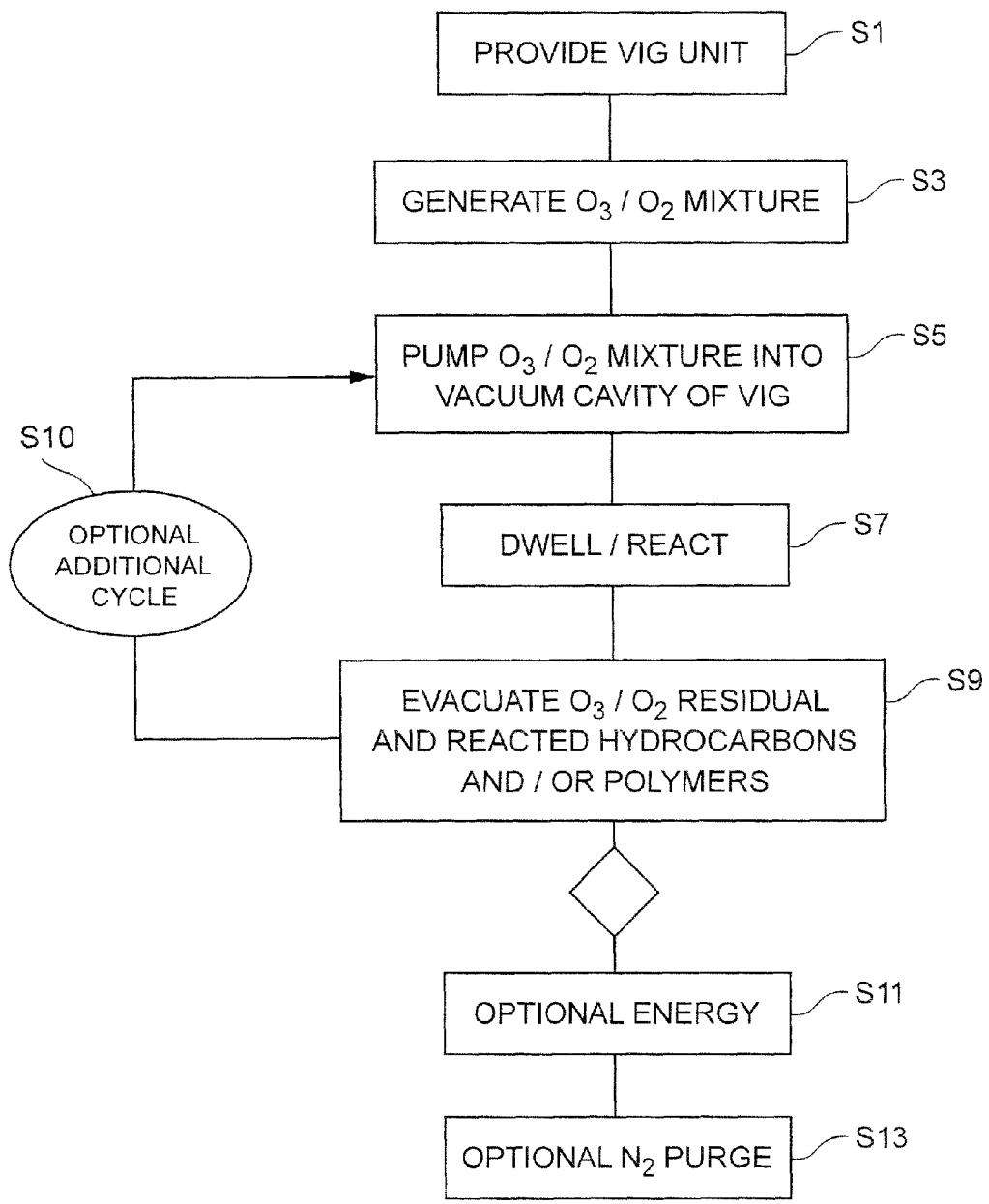

FIG, 2 is a top plan view of a conventional VIG unit;

FIG. 3 is a schematic partial cross sectional diagram illustrating components used in providing a cleaning method according to an example embodiment;

FIG. 4 is a flowchart illustrating a method of cleaning a vacuum cavity of a VIG unit according to an example embodiment.

Figure 6:
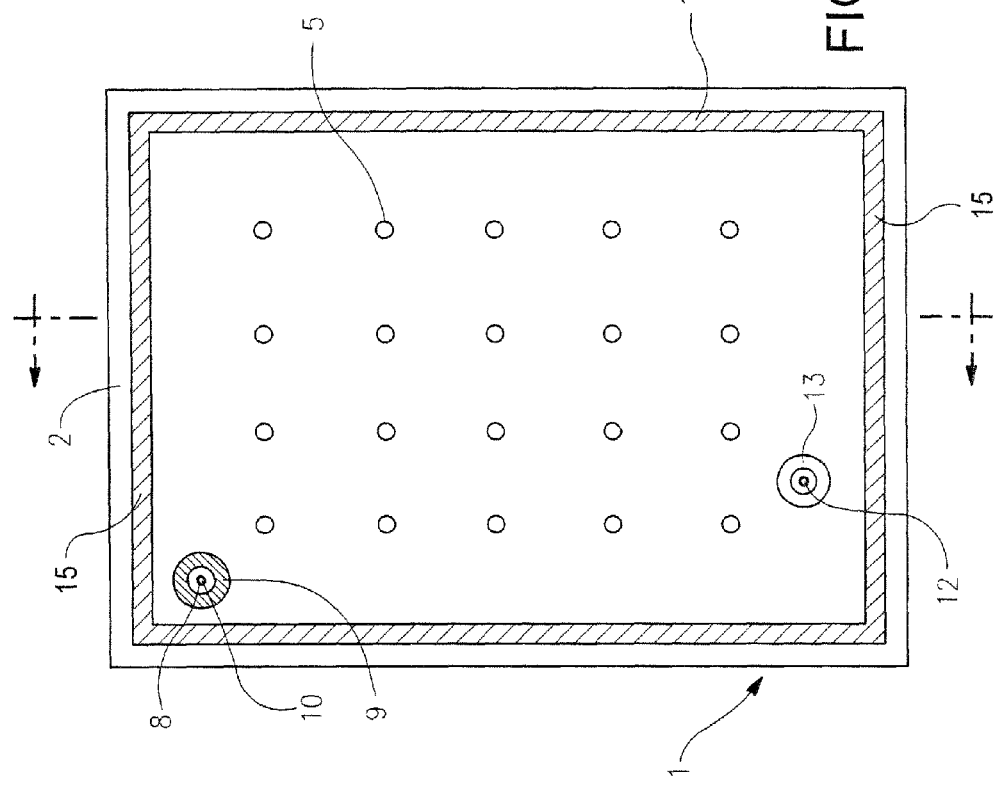
Figure 5:
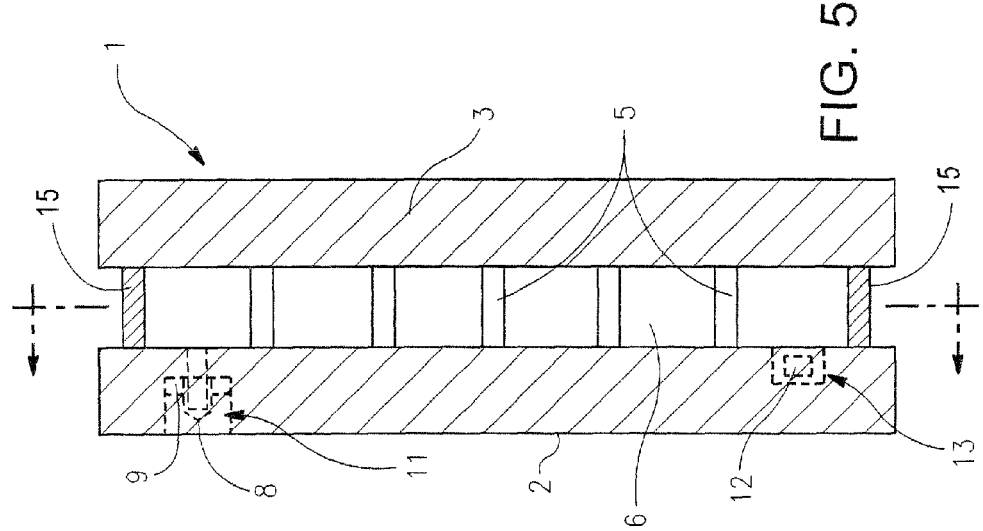

FIG. 5 is a cross sectional schematic diagram of a VIG unit including a vanadium based or VBZ type edge seal; and FIG. 6 is a top plan view of a VIG unit including a vanadium based or VBZ type edge seal.

DETAILED DESCRIPTION OF EXAMPLE EMBODIMENTS

Certain example embodiments will be described in detail herein with reference to the foregoing drawings in which like reference numerals refer to like elements. It will be understood that the embodiments described herein are intended to be illustrative, not limiting, and that those skilled in the art will understand that various modifications may be made without departing from the true spirit and full scope of the claims appended hereto.

According to certain example embodiments disclosed and described in detail herein, a low-temperature (e.g., <250° C.) cleaning process is provided to remove the residual hydrocarbon compounds that may be present in a vacuum cavity of a VIG window unit, in making VIG window units. For example, according to certain example embodiments, providing ozone ($O_3$) as a component of a purge gas used during initial pump down may be used to oxidize carbon compounds and convert them to more volatile compounds, such as, for example, and without limitation, CO or $CO_2$, that may then be easily removed through sequential pump down and may be even further diluted by sequential $N_2$ purging and a final deep vacuum pull down. Removal of these residual carbon compounds enhances the overall performance of VIG window units by, for example, and without limitation, maintaining the overall insulating value (e.g., R-value), improving the useful life of the VIG window unit and reducing degradation of coatings that may be used on an interior surface of the glass substrates of the VIG unit. VIG window units may be used as windows in residential homes, office buildings, apartment buildings, doors, and/or the like.

According to certain example embodiments, an example method of decomposing the residual carbon for removal from the cavity of a VIG window unit is disclosed, wherein an ozone ($O_3$) and oxygen ($O_2$) mixture, for example, is introduced into the VIG window unit cavity prior to or during an initial stage of a vacuum pump down process for evacuating the cavity. The example $O_3/O_2$ mixture replaces at least some of the previously used nitrogen ($N_2$) purges performed to dilute trace gases in the VIG vacuum cavity. According to certain example embodiments, a small percentage of $O_3$, such as, for example, and without limitation, may preferably be in a range of about 1-15 wt. % ozone, may be more preferably in a range of about 5-10 wt. % ozone, and may be even more preferably in a range of 7.5-8.0 wt. % ozone, with the remainder being primarily oxygen, is generated using, for example, an ozone generator using air or pure oxygen. Small amounts of other elements may be present in the ozone mixture used for ozonization according to certain example embodiments without affecting the desirable properties of the ozone mixture. Using higher ozone percentage may result in disadvantageous reactions between the ozone and coatings, such as, for example, low-E coatings, that may be provided on an interior surface of at least one of the transparent glass substrates of the VIG unit. The resulting $O_3/O_2$ mixture is then introduced into the cavity of the VIG under reduced pressure, allowed to react with the residual hydrocarbons and/or polymers, and then removed from the cavity by, for example, a vacuum pump. A cycle of $O_3/O_2$ purges may be repeated as necessary to reduce the contaminants to suitable or acceptable levels. For example, and without limitation, according to certain example embodiments, a preferred number of $O_3/O_2$ purge cycles may be in a range of about 1-15 cycles, or more preferably about 2-10 cycles, and even more preferably about 2-6 cycles. Moreover, dwell times for the $O_3/O_2$ purge cycles may be limited to reduce the possibility of undesirable reaction of ozone with, for example, coatings that may be provided on an interior surface of at least one glass substrate of the VIG window unit. For example, and without limitation, according to certain example embodiments, preferred dwell times may be in a range of about 5-25 sec., or more preferably in a range of about 10-20 sec., and more preferably in a range of about 10-15 sec., and in any event, preferably less than 30-45 sec. The dwell time is the period of time that the cleaning gas mixture comprising ozone is maintained in the cavity. Example acceptable contaminant levels may be, for example, and without limitation, about 10E-12 or lower. It will be understood that acceptable contaminant levels may be determined or selected by the manufacturer.

It is also noted that the ozonization of the cavity of the VIG window unit described above may performed at substantially ambient temperatures thereby avoiding the disadvantages and problems associated with high-temperature processing, especially when using newer edge seal compositions, such as, for example, vanadium based or VBZ type edge seal compositions. In any event, according to certain example embodiments, ozonization is preferably performed in a low temperature environment, preferably below about 250° C., and more preferably at about ambient temperatures. According to further example embodiments, it may be the case that additional energy may be required to facilitate or improve the carbon removal achieved by the ozonization process described above. Thus, it is contemplated that additional energy in the form of, for example, and without limitation, elevated temperatures (remaining below levels that might adversely affect the edge seal composition), radio frequency (RF) plasma, corona discharge (electric fields), UV lamp, or the like, may be used to increase reaction rates of the residual hydrocarbons and/or polymers and the ozone.

According to certain further example embodiments, resulting trace amounts of volatile carbons that may remain, even after an ozonization process such as, for example, those described above, may be further diluted by sequential $N_2$ purging and/or a final deep vacuum pull down. Using an ozonization process along the lines described by way of example above, facilitates removal of residual carbon compounds, improves the overall lifetime of a VIG unit, provides a more stable R value and helps maintain coatings that may be present on the surface(s) of the glass substrates in the vacuum cavity.

With reference to FIGS. 5 and 6, a schematic cross sectional view of an example VIG window unit 1 is illustrated. The VIG window unit 1 includes spaced apart first and second transparent glass substrates 2, 3 that may be interconnected by an edge seal 15 which may, for example, be of or include a vanadium based or VBZ type seal 15. Example vanadium based or VBZ type seal compositions are disclosed in U.S. patent application Ser. No. 13/354,963, filed Jan. 20, 2012, the disclosure of which is incorporated by reference herein in its entirety. It will be understood that the embodiments disclosed herein are equally applicable to VIG configurations using any suitable seal material. In certain embodiments, the transparent glass substrates 2, 3 may be approximately the same size. However, in certain other example embodiments, one glass substrate may be larger than the other to provide, for example, an approximately L-shaped step proximate an edge of the VIG unit. One or both of the glass substrates 2, 3 may also optionally include at least one coating material (not shown), such as, for example, and without limitation, a low-E coating. It will be understood that various coatings may be present on an interior surface of at least one of the glass substrates 2, 3, and that such coatings provide various beneficial performance characteristics to the VIG unit 1. In certain example embodiments, the VIG window unit has a visible transmission of at least about 30%, more preferably of at least about 40%, even more preferably of at least about 50%, and even more preferably of at least about 60% or 70%.

An array of support pillars/spacers 5 may also be included between the glass substrates 2, 3 to maintain the spacing of the substrates in view of the lower than atmospheric pressure that is ultimately provided in cavity 6 between the substrates 2, 3 in certain example embodiments, the spacers may have a height, for example, of about 0.1 to 1.0 mm, more preferably from about 0.2 to 0.4 mm The height of the spacers may define the height of the vacuum cavity 6. As noted above, the spacers 5 are preferably of a size that is sufficiently small so as to be visibly unobtrusive. According to certain example embodiments, the spacers may be made of or include solder glass, glass, ceramic, metal, polymer, or any other suitable material. Additionally, the spacers 5 may be, for example, generally cylindrical, round, spherical, dime-shaped, C-shaped, pillow-shaped or any other suitable shape.

A pump-out tube 8, that may be hermetically sealed, for example, using solder glass 9 is provided through a hole 10 that passes from an interior surface of one of the glass substrates, e.g., substrate 3 and through the glass substrate 3 and extending beyond the outside surface thereof. The pump-out tube 8 is used in a process to evacuate the cavity 6 between the substrates 2, 3, such as, for example, by attaching a vacuum pump to the pump-out tube 8 and evacuating the cavity to a low pressure, e.g., a pressure lower than atmospheric pressure. In a preferred example, a pressure in the cavity 6 is, for example, preferably below about $10^{-2}$ Torr, and more preferably below about $10^{-3}$ Torr, and even more preferably below about $5 \times 10^{-4}$ Torr. In certain example embodiments, the pump-out tube 8, may, for example, have a diameter or distance from about 0.1 to 1.0 mm, more preferably from about 0.3 to 0.7 mm, and even more preferably from about 0.5 mm. After evacuating the cavity 6, the pump-out tube 8 may be sealed, for example, by melting the tip of the tube 8 by any suitable means, such as, for example, by laser.

Turning to FIG. 3, a schematic illustration of an example arrangement for providing ozonization of an example VIG window unit 1, such as, for example, illustrated in FIGS. 5 and 6, according to certain example embodiments is shown. According to certain example embodiments, an ozone ($O_3$) and oxygen ($O_2$) mixture, for example, is introduced into the vacuum cavity 6 of a VIG unit 1 during an initial stage of a vacuum pump down process. According to this illustrative, non-limiting, example, the peripheral edge seal 15 is preferably of or includes a vanadium based compound or VBZ, such as, for example, and without limitation, the edge seal compounds disclosed in U.S. patent application Ser. No. 13/354, 963, the disclosure of which is incorporated by reference herein in its entirety. It will be understood, however, that according to example embodiments disclosed herein, the VIG window unit may use any seal material. The example $O_3/O_2$ mixture replaces at least some of the previously used nitrogen ($N_2$) purges performed to dilute trace gases in the VIG vacuum cavity. According to certain example embodiments, a small percentage of $O_3$, such as, for example, and without limitation, may preferably be in a range from about 1-15 wt. % ozone, may be more preferably in a range from about 5-10 wt. % ozone, and may be even more preferably in a range from about 7.5-8.0 wt. % ozone, with the remainder being primarily oxygen, is generated using, for example, an ozone generator 25 using pure oxygen from an oxygen supply 20, such as, for example, and without limitation, a compressed oxygen tank. It will be understood that the ozone generator 25 may also generate the $O_3/O_2$ mixture by processing air and that small amounts of other elements may be present in the mixture without adversely affecting the beneficial properties of the mixture. Using higher ozone percentages may result in disadvantageous reactions between the ozone and coatings, such as, for example, low-E coatings (not shown), that may be provided on an interior surface of at least one of the glass substrates 2, 3 of the VIG unit 1. The resulting $O_3/O_2$ mixture is then introduced via pump 30 into the vacuum cavity 6 of the VIG 1 under reduced pressure. The vacuum pump 30 may preferably be connected to the vacuum cavity 6 of the VIG unit 1 via pump-out tube 8. The $O_3/O_2$ mixture is then allowed to react with the residual hydrocarbons and/or polymers to oxidize residual carbon compounds, such as, for example, and without limitation, hydrocarbons and/or polymers, and convert them to more volatile CO or $CO_2$ that may then be easily removed through a subsequent sequential pump down. As noted above, preferred dwell times for the $O_3/O_2$ mixture in the cavity 6 according to certain example embodiments, may be in a range from about 5-25 sec., or more preferably in a range from about 10-20 sec., and even more preferably in a range from about 10-15 sec., and in any event, preferably less than 30-45 sec. The residual $O_3/O_2$ mixture, together with reacted residual hydrocarbons and/or polymers, are then removed from the cavity 6 by, for example, vacuum pump 30. A cycle of $O_3/O_2$ purges may be repeated as necessary to reduce the contaminants to suitable or acceptable levels. For example, and without limitation, according to certain example embodiments, a preferred number of $O_3/O_7$ purge cycles may be in a range from about 1-15 cycles, or more preferably in a range from about 2-10 cycles, and even more preferably in a range from about 2-6 cycles.

Turning now to FIG. 4, a flowchart illustrating a method for cleaning a vacuum cavity of a VIG window unit using a cycle of ozonization along the lines described above is provided. A VIG window unit having a sealed vacuum cavity with a completed seal of or including, for example, and without limitation, a vanadium based or VBZ compound, and an unsealed pump-out tube is provided S1. The pump-out tube is connected to a pump, preferably a bi-directional pump, that both forces gas(es) and/or gas mixtures into the vacuum cavity as well as evacuating gas(es) and/or gas mixtures and other volatile compound from the vacuum cavity. The pump may be connected to the vacuum cavity of the VIG unit to provide an ozone ($O_3$) and oxygen ($O_2$) mixture, for example, into the vacuum cavity of a VIG window unit during an initial stage of a vacuum pump down process. In this example, as noted above, the seal is preferably of or includes a vanadium based compound or VBZ. According to certain example embodiments, a small percentage of $O_3$, such as, for example, and without limitation, may preferably be in a range from about 1-15 wt. % ozone, may be more preferably in a range from about 5-10 wt. % ozone, and may be even more preferably in a range from about 7.5-8.0 wt. % ozone, with the remainder being primarily oxygen, is generated S3 as discussed above using, for example, an ozone generator using pure oxygen from an oxygen supply, such as, for example, and without limitation, a compressed oxygen tank. It will be understood that the ozone generator may also generate the $O_3/O_2$ mixture by processing air and that small amounts of other elements may be present in the mixture without adversely affecting the beneficial properties of the mixture. Using higher ozone percentages may result in disadvantageous reactions between the ozone and coatings, such as, for example, low-E coatings (not shown), that may be provided on an interior surface of at least one of the glass substrates of the VIG window unit. The resulting $O_3/O_2$ mixture is then introduced via pump into the vacuum cavity of the VIG, for example, under reduced pressure S5. The vacuum pump may preferably be connected to the vacuum cavity of the VIG unit via pump-out tube. The $O_3/O_2$ mixture is then allowed to react with the residual hydrocarbons and/or polymers S7 to oxidize residual carbon compounds, such as, for example, and without limitation, hydrocarbons and/or polymers, and convert them to more volatile CO or $CO_2$ that may then be easily removed through a subsequent sequential pump down. As noted above, preferred dwell times for the $O_3/O_2$ mixture in the cavity S7 according to certain example embodiments, may be in a range from about 5-25 sec., or more preferably in a range from about 10-20 sec., and even more preferably in a range of about 10-15 sec., and in any event, preferably less than 30-45 sec. The residual $O_3/O_2$ mixture, together with reacted residual hydrocarbons and/or polymers, are then removed from the cavity by, for example, vacuum pump S9. A cycle of $O_3/O_2$ purges (s10 and S5, S7 S9) may be repeated as necessary to reduce the contaminants to suitable or acceptable levels. For example, and without limitation, according to certain example embodiments, a preferred number of $O_3/O_2$ purge cycles may be in a range of about 1-15 cycles, or more preferably in a range of about 2-10 cycles, and even more preferably in a range of about 2-6 cycles.

According to certain example embodiments, it may be the case that additional energy may he required to facilitate or improve the carbon removal achieved by the ozonization process described above. Thus, it is contemplated that additional energy in the form of, for example, and without limitation, elevated temperatures (remaining below levels that might adversely affect the edge seal composition), radio frequency (RF) plasma, corona discharge (electric fields), UV lamp, or the like, S11 may be used to increase reaction rates of the residual hydrocarbons and/or polymers and the ozone.

According to certain further example embodiments, resulting trace amounts of volatile carbons that may remain, even after an ozonization process such as, for example, those described above, may be further diluted by sequential $N_2$ purging S13 and a final deep vacuum pull down. Using an ozonization process described by way example above, facilitates removal of residual carbon compounds, improves the overall lifetime of a VIG unit, provides a more stable R value and helps maintain coatings that may be present on the surface(s) of the glass substrates in the vacuum cavity.

In certain example embodiments of this invention, there is provided a method of making a vacuum insulated glass window unit, the method comprising: providing first and second glass substrates for the vacuum insulated window unit, with a seal and a cavity located between the glass substrates; pumping a cleaning gas mixture comprising ozone into the cavity; and removing compounds created by reaction with the cleaning gas mixture, and residual cleaning gas, from the cavity.

The method of the immediately preceding paragraph may further comprise maintaining at least part of the cleaning gas mixture comprising ozone in the cavity for a period of time. The period of time may be from about 10-15 seconds. Moreover, the method may comprise providing additional energy during the step of maintaining by at least one of: (i) heating the substrates and the cavity therebetween, (ii) generating a radio frequency (RF) plasma proximate the cavity, (iii) generating a corona discharge proximate the cavity, and/or (iv) irradiating the substrates and the cavity with at least UV radiation. Optionally, said pumping, maintaining, and removing may be performed at temperature of less than or equal to 250° C., more preferably at substantially ambient temperature.

The method of any of the preceding two paragraphs may further comprise evacuating the cavity between the substrates to a pressure less than atmospheric pressure. Said pumping may be performed prior to, and/or during, said evacuating. After the evacuating, the method may include sealing a pump-out tube.

The method of any of the preceding three paragraphs may comprise repeating at least the steps of pumping and removing at least two times, more preferably from two to six times.

The method of any of the preceding four paragraphs may further comprise purging said cavity with gas comprising nitrogen. The purging may occur after at least a substantial portion of said cleaning gas mixture comprising ozone has been removed from the cavity.

The method of any of the preceding five paragraphs may further comprise performing a deep vacuum purge of said cavity.

In the method of any of the preceding six paragraphs, said cleaning gas mixture comprises from about 1-15 wt. % ozone, more preferably from about 5-10 wt. % ozone.

In the method of any of the preceding seven paragraphs, said cleaning gas mixture may further comprise oxygen.

In the method of any of the preceding eight paragraphs, ozone of the cleaning gas mixture may react with residual hydrocarbons and/or polymers present in the cavity; and said removing may include removing compounds created by a reaction of ozone of the cleaning gas mixture and the residual hydrocarbons and/or polymers.

The method of any of the preceding nine paragraphs may further comprise forming the seal so that the seal comprises vanadium.

In the method of any of the preceding ten paragraphs, said seal may be an edge seal.

In the method of any of the preceding eleven paragraphs, the seal may comprise vanadium, barium and zinc.

While certain example embodiments have been described and disclosed herein, it will he understood that the embodiments described herein are intended to be illustrative, not limiting, and that those skilled in the art will understand that various modifications may be made without departing from the true spirit and full scope of the claims appended hereto.

What is claimed is:

1. A method of making a vacuum insulated glass window unit, the method comprising:
providing first and second glass substrates for the vacuum insulated window unit, with a seal and a cavity located between the glass substrates;
pumping a cleaning gas mixture comprising ozone into the cavity; and
removing compounds created by reaction with the cleaning gas mixture, and residual cleaning gas, from the cavity.

2. The method of claim 1, further comprising maintaining at least part of the cleaning gas mixture comprising ozone in the cavity for a period of time.

3. The method of claim 2, wherein the period of time is from about 10-15 seconds.

4. The method of claim 2, further comprising providing additional energy during the step of maintaining by at least one of: (i) heating the substrates and the cavity therebetween, (ii) generating a radio frequency (RF) plasma proximate the cavity, (iii) generating a corona discharge proximate the cavity, and/or (iv) irradiating the substrates and the cavity with at least UV radiation.

5. The method of claim 2, wherein at least said pumping, maintaining, and removing are performed at temperature of less than or equal to 250° C.

6. The method of claim 2, wherein at least said pumping, maintaining, and said removing are performed at substantially ambient temperature.

7. The method of claim 1, further comprising evacuating the cavity between the substrates to a pressure less than atmospheric pressure.

8. The method of claim 7, wherein said pumping is performed prior to said evacuating.

9. The method of claim 7, wherein said pumping is performed during said evacuating.

10. The method of claim 7, further comprising, after said evacuating, sealing a pump-out tube.

11. The method of claim 1, further comprising repeating the steps of pumping and removing at least two times.

12. The method of claim 1, wherein the steps of pumping and removing are repeated from two to six times.

13. The method of claim 1, further comprising purging said cavity with gas comprising nitrogen.

14. The method of claim 13, wherein said purging occurs after at least a substantial portion of said cleaning gas mixture comprising ozone has been removed from the cavity.

15. The method of claim 1, further comprising performing a vacuum purge of said cavity.

16. The method of claim 1, wherein said cleaning gas mixture comprises from about 1-15 wt.% ozone.

17. The method of claim 1, wherein said cleaning gas mixture comprises from about 5-10 wt.% ozone.

18. The method of claim 1, wherein said cleaning gas mixture further comprises oxygen.

19. The method of claim 1, wherein ozone of the cleaning gas mixture reacts with residual hydrocarbons and/or polymers present in the cavity; and said removing includes removing compounds created by a reaction of ozone of the cleaning gas mixture and the residual hydrocarbons and/or polymers.

20. The method of claim 1, further comprising forming the seal so that the seal comprises vanadium.

21. The method of claim 1, wherein said seal is an edge seal.

22. The method of claim 1, wherein the seal comprises vanadium, barium and zinc.

23. The method of claim 1, wherein one of the glass substrates includes a low-E coating on an interior surface thereof facing the cavity.

* * * * *